(12) United States Patent
Smits et al.

(10) Patent No.: US 11,442,919 B2
(45) Date of Patent: Sep. 13, 2022

(54) DATA RELIABILITY ANALYSIS

(71) Applicant: Accenture Global Services Limited, Dublin (IE)

(72) Inventors: Eduard Smits, Apeldoorn (NL); Rob Goes, Nieuwkoop (NL); Simon Coombs, Derbyshire (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1070 days.

(21) Appl. No.: 14/814,849

(22) Filed: Jul. 31, 2015

(65) Prior Publication Data
US 2017/0031969 A1 Feb. 2, 2017

(51) Int. Cl.
| G06F 16/23 | (2019.01) |
| G06F 11/30 | (2006.01) |
| G06F 16/13 | (2019.01) |
| G06Q 10/06 | (2012.01) |
| G06F 11/00 | (2006.01) |
| G06F 11/14 | (2006.01) |

(52) U.S. Cl.
CPC ........ *G06F 16/2365* (2019.01); *G06F 11/008* (2013.01); *G06F 11/1448* (2013.01); *G06F 11/3051* (2013.01); *G06F 16/13* (2019.01); *G06Q 10/06* (2013.01); *G06F 2201/84* (2013.01)

(58) Field of Classification Search
CPC .... G06F 11/1448; G06F 16/128; G06F 16/27; G06F 2201/84; G06F 16/13; G06F 11/3051; G06F 11/008; G06F 16/2365; G16Z 99/00; G06Q 10/06
USPC ......................................................... 707/654
See application file for complete search history.

(56) References Cited

U.S. PATENT DOCUMENTS

| 6,742,141 | B1 | 5/2004 | Miller |
| 8,994,514 | B1 * | 3/2015 | Juels ................... G06Q 10/0833 340/10.51 |
| 10,133,276 | B1 * | 11/2018 | Shydo, Jr. ............ G05D 1/0223 |
| 10,169,858 | B2 * | 1/2019 | Humphrey .............. G06T 7/001 |

(Continued)

FOREIGN PATENT DOCUMENTS

WO      2015/069262 A1     5/2015

OTHER PUBLICATIONS

C. Ward et al., "Integrated change and configuration management", IBM System Journal, Jul. 1, 2007, pp. 459-478.

*Primary Examiner* — Tamara T Kyle
*Assistant Examiner* — Raheem Hoffler
(74) *Attorney, Agent, or Firm* — Mannava & Kang, P.C.

(57) ABSTRACT

According to examples, data reliability analysis may include scanning a component of a data supply chain, and determining, based on the scanning, configurations of the component. Data reliability analysis may further include analyzing the configurations, and detecting, based on the analysis of the configurations, a change in at least one of the configurations. The change may be compared against a corresponding configuration rule to determine whether the change is a defect that affects consistency of data related to the component. In response to a determination that the change is the defect, a solution related to the defect may be determined based on the corresponding configuration rule. A configuration of the component may be modified, based on the solution related to the defect, to correct the defect that affects the consistency of the data.

19 Claims, 6 Drawing Sheets

(56) References Cited

U.S. PATENT DOCUMENTS

| | | |
|---|---|---|
| 10,755,209 B2* | 8/2020 | Ramachandran ...... G06Q 10/06 |
| 2002/0095322 A1* | 7/2002 | Zarefoss ................ G06Q 10/06 717/100 |
| 2002/0156799 A1 | 10/2002 | Markel et al. |
| 2004/0006612 A1 | 1/2004 | Jibbe et al. |
| 2004/0193380 A1 | 9/2004 | Schroeder |
| 2006/0163338 A1* | 7/2006 | Allen .................... A01K 11/008 235/375 |
| 2007/0028219 A1* | 2/2007 | Miller .................. G06F 11/3409 717/124 |
| 2008/0027958 A1* | 1/2008 | Kapoor ................. G06F 16/254 |
| 2008/0281833 A1 | 11/2008 | Cain et al. |
| 2009/0276669 A1* | 11/2009 | Hoopes ................ G06Q 10/08 714/746 |
| 2010/0125489 A1* | 5/2010 | Surendra ............. G06Q 20/203 707/802 |
| 2011/0126608 A1 | 6/2011 | Gehlhoff et al. |
| 2011/0145053 A1* | 6/2011 | Hashim-Waris ....... G06Q 50/22 705/14.35 |
| 2011/0239055 A1 | 9/2011 | Busayarat et al. |
| 2012/0022700 A1* | 1/2012 | Drees ................. G06Q 30/0283 700/276 |
| 2012/0192008 A1 | 7/2012 | Suzuki |
| 2012/0272099 A1 | 10/2012 | Keith, Jr. |
| 2013/0055042 A1* | 2/2013 | Al Za'noun ..... G06Q 10/06395 714/746 |
| 2013/0080100 A1 | 3/2013 | Wang et al. |
| 2013/0124607 A1* | 5/2013 | Griffith .................. H04L 43/10 709/203 |
| 2013/0174111 A1* | 7/2013 | Durkan ................. G06F 30/398 716/112 |
| 2013/0185309 A1* | 7/2013 | Bhide ................. G06F 16/2272 707/748 |
| 2013/0227236 A1* | 8/2013 | Flynn .................... G06F 16/188 711/172 |
| 2014/0040182 A1* | 2/2014 | Gilder ............... G06F 17/30578 707/602 |
| 2014/0101757 A1 | 4/2014 | Gnesda et al. |
| 2014/0336791 A1* | 11/2014 | Asenjo .................. G06Q 10/06 700/44 |
| 2014/0337277 A1 | 11/2014 | Asenjo et al. |
| 2015/0012509 A1* | 1/2015 | Kirn .................. G06F 16/24556 707/700 |
| 2015/0178169 A1 | 6/2015 | Wertheiner et al. |
| 2015/0332445 A1* | 11/2015 | Harada ................... G06T 7/001 382/149 |

* cited by examiner

500

```
SCAN COMPONENTS OF A DATA SUPPLY CHAIN
502
```

```
DETERMINE, BASED ON THE SCAN OF THE COMPONENTS
OF THE DATA SUPPLY CHAIN, CONFIGURATIONS OF THE
COMPONENTS OF THE DATA SUPPLY CHAIN
504
```

```
ANALYZE THE CONFIGURATIONS OF THE COMPONENTS OF THE
DATA SUPPLY CHAIN
506
```

```
DETECT, BASED ON THE ANALYSIS OF THE CONFIGURATIONS OF THE
COMPONENTS OF THE DATA SUPPLY CHAIN, A CHANGE IN AT LEAST ONE OF
THE CONFIGURATIONS OF THE COMPONENTS OF THE DATA SUPPLY CHAIN
AND A CHANGE IN A CONFIGURATION OF THE DATA SUPPLY CHAIN
508
```

```
COMPARE THE CHANGE IN THE CONFIGURATION OF THE DATA SUPPLY CHAIN
AGAINST A CORRESPONDING CONFIGURATION RULE TO DETERMINE WHETHER
THE CHANGE IN THE CONFIGURATION OF THE DATA SUPPLY CHAIN IS A DEFECT
THAT AFFECTS CONSISTENCY OF DATA RELATED TO THE DATA SUPPLY CHAIN
510
```

```
IN RESPONSE TO A DETERMINATION THAT THE CHANGE IS THE DEFECT THAT
AFFECTS THE CONSISTENCY OF THE DATA RELATED TO THE DATA SUPPLY
CHAIN, DETERMINE, BASED ON THE CORRESPONDING CONFIGURATION RULE,
A SOLUTION RELATED TO THE DEFECT THAT AFFECTS THE CONSISTENCY OF
THE DATA RELATED TO THE DATA SUPPLY CHAIN
512
```

```
MODIFY, BASED ON THE SOLUTION RELATED TO THE DEFECT THAT AFFECTS THE
CONSISTENCY OF THE DATA RELATED TO THE DATA SUPPLY CHAIN, THE
CONFIGURATION OF THE DATA SUPPLY CHAIN TO CORRECT THE DEFECT THAT
AFFECTS THE CONSISTENCY OF THE DATA RELATED TO THE DATA SUPPLY CHAIN
514
```

FIG. 5

DATA RELIABILITY ANALYSIS

BACKGROUND

Data may include a set of values of qualitative or quantitative variables, where each piece of data may represent an individual piece of information. Data may be measured, collected, reported, and analyzed, for example, to be displayed in a graph or image format for visualization. Generally, data may pertain to the representation or coding of existing information or knowledge in a form that is suitable for better usage or processing. Reliability of data may be paramount for further analysis related to the data.

BRIEF DESCRIPTION OF DRAWINGS

Features of the present disclosure are illustrated by way of examples shown in the following figures. In the following figures, like numerals indicate like elements, in which:

FIG. 5 illustrates another flow diagram of a method for data reliability analysis, according to an example of the present disclosure.

DETAILED DESCRIPTION

Figure 1:
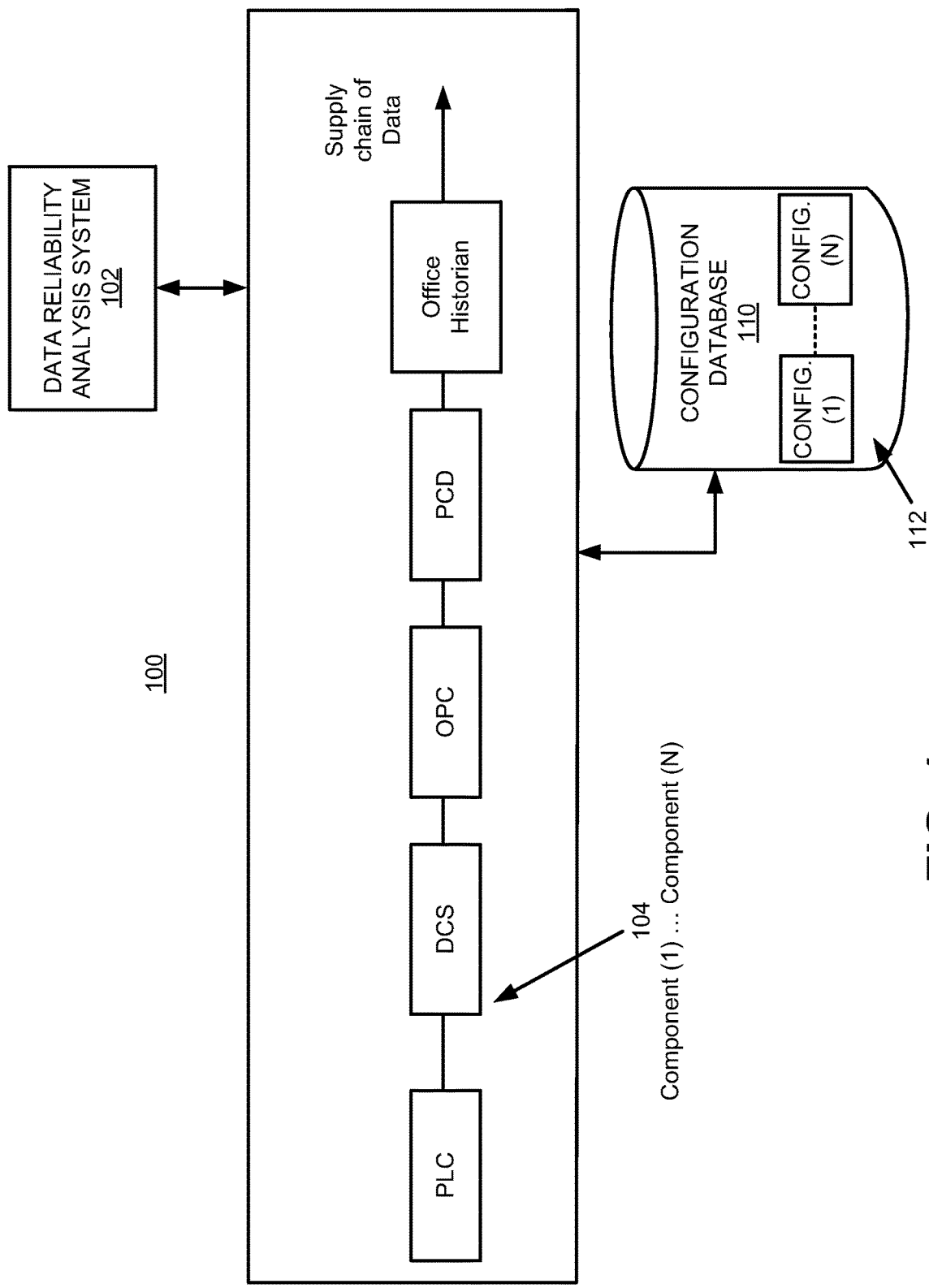
FIG. 1 illustrates an environment including a data reliability analysis system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In today's data-rich environments, data including real-time data may be used for management of a variety of tasks. For example, in a manufacturing environment, data including real-time production data may be used for monitoring ongoing operations, and/or for investigating and optimizing a process (e.g., maintenance, inventory control, etc.). At the enterprise level, data may be used for key performance indicators (KPI) reporting, optimizing tasks, cost comparisons, license to operate analysis, etc.). According to another example, a data stream from a temperature sensor may be denoted as a Tag, where the data supply for each Tag or group of Tags related to a plurality of temperature sensors may be different depending, for example, on where in a process the data has its source. A Tag may be described as a data stream that refers to the source of the data stream that may be a sensor, an actor, an error signal, etc. The nature of the source may determine the behavior of a specific Tag, and thereby the right configuration of that Tag. Further examples where real-time data may be used directly from assets for critical decisions include environmental emissions, preventive maintenance, waste minimization, uptime optimization, etc.

The real-time data may be measured at various sampling rates, such as minutes, seconds, sub-seconds, etc. The real-time data may also be denoted as time-series data, and databases that are used as a basis for measured data may be denoted "historians".

Since such data may be highly relevant for meeting related demands, reliability and trustworthiness of such data can be paramount. In this regard, an aspect that has an effect on the reliability and trustworthiness of the data includes configuration parameters throughout an entire data supply chain. Configuration parameters may be described as a set of attributes that describe how a data stream originating from an input signal (e.g., a sensor) will be handled in a particular system. The handling of a data stream may include transforming, storing, contextualizing, or anything else based on the function of a specific system.

The data supply chain may include data that is related to assets that include sensors (e.g., smart sensors, sensor networks, etc.), and systems (e.g., a distributed control system (DCS)), sub-systems, historians, applications, analytics tools, and/or reports). The supply chain of data may include a plurality of systems that consume, generate, store, and pass the data through or from other systems. Such a supply chain of data may include, for example, of a sensor scanned by a Programmable Logic Controller (PLC) for data. The PLC may be described as a digital computer used for automation of industrial electromechanical processes, such as control of machinery on factory assembly lines, amusement rides, or light fixtures. PLCs may be designed for multiple arrangements of digital and analog inputs and outputs. A PLC is an example of a "hard" real-time system since output results may be produced in response to input conditions within a limited time, otherwise unintended operation may result.

The PLC may pass its information through to a DCS system that provides its data via an Open Platform Communications (OPC) system via networking equipment to a historian. The DCS may be described as a control system for a process or plant, where control elements may be distributed throughout the system. This is in contrast to non-distributed systems, which may use a single controller at a central location. In a DCS, a hierarchy of controllers may be connected by communications networks for command and monitoring. An OPC may be described as a series of standards and specifications for industrial telecommunication. An OPC may specify the communication of real-time plant data between control devices from different manufacturers. The historian may bridge the gap between a process control domain and an office domain. In the office domain, the real-time data may be aggregated and sent to an enterprise resource planning (ERP) system and other report tools.

Data handling components (e.g., DCS, historian, etc.) in a supply chain of data may include standard components, and may not be optimized for a single (or uniform) piece of equipment, and therefore, inconsistencies and inaccuracies in the data may be introduced. Moreover, sensors may also include inconsistencies and inaccuracies. In a well-managed data supply chain, these inconsistencies and inaccuracies may not affect the reliability and trustworthiness of the real-time data. However, a plant and/or asset may include several hundred thousand Tags and several data handling systems in a supply chain of data. Thus, processes related to such plants and/or assets may be dynamic, with systems and sensors being frequently changed (e.g., repaired, or replaced). Thus, real-time data from of a data supply chain may be unreliable.

Another aspect that may be a threat for the reliability and trustworthiness of real time data is whether the data is originating from a valid source, and if the data has not been deliberately altered by a party that is not authorized to perform a particular action. For example, such unauthorized actions may be performed via the configuration of a data supply chain.

In addition to the aforementioned technical aspects, organizational aspects may also add complexities and thus unreliability to a data supply chain. For example, standardization or lack thereof in an organization may add complexities with respect to assets involved in a data supply chain (e.g., with respect to replacement and/or maintenance of assets), and thus unreliability to the data supply chain (i.e., an end-value of the data may not be correct as a basis for an analysis). For example, an organization may include different teams that are responsible for configuring, modeling, and maintaining different systems and functionalities of the organization.

In order to address the aforementioned challenges with respect to data reliability, a data reliability analysis system and a method for data reliability analysis are disclosed herein. For the system and method disclosed herein, a well-managed supply chain of data may be achieved, for example, by repeated scanning, comparison, detection, reporting, and correction of configurations, for example, including Tag configurations, in a data supply chain. A Tag configuration may be described as the configuration of a single data stream in a plant that is handled in a system. A "name" is one of the attributes from a sensor. Other attributes may include range, alarm levels, PLC memory address, data type, representation behavior, etc. One Tag may include many attributes to describe its behavior.

According to examples, the system and method disclosed herein may operate in a generic manner that is independent of vendor specifics.

According to examples, the system and method disclosed herein may provide for the repeated scanning of configurations in a data supply chain (e.g., including sensors, DCS, historians, etc.) to generate a configuration database. Configurations from the configuration database may be compared for a data supply chain, and inconsistencies may be identified based on the comparison. Based, for example, on configuration rules, the configurations may be automatically (i.e., without human intervention) updated. The system and method disclosed herein may thus provide for increased data reliability based on an indication of consistency related to how real-time data was generated.

According to examples, the system and method disclosed herein may unite a data supply chain, for example, by reading multiple configurations from heterogeneous environments (e.g., sensors, DCS, historians, vendors, and departments in an organization).

According to examples, the system and method disclosed herein may provide for the generation of a configuration database to bring different configuration sets into a normalized and harmonized configuration database. These aspects may provide a basis for change management in an asset at multiple levels (e.g., uniting operational technology (OT) and information technology (IT), from a plant floor to management level).

According to examples, the system and method disclosed herein may provide for a combination of infrastructure information (e.g., temperature sensor information), and domain knowledge, with a focus on safety and process optimization.

According to examples, the system and method disclosed herein may provide configuration reliability augmentation, for example, by adding a reliability component to real-time process values. These aspects may provide an indication of whether it is safe to make decisions based on a particular process value.

According to examples, the system and method disclosed herein may provide pre-configured, and repeated monitoring and checking of a data supply chain. In this regard, the system and method disclosed herein may provide for the minimization of system load by tuning. Further, a scanning frequency related to a data supply chain may be increased depending on a number of inconsistencies identified (e.g., when a number of inconsistencies is greater than a predetermined threshold).

According to examples, the system and method disclosed herein may provide for the repair of configurations for certain inconsistencies. For example, based on rules and domain expertise, certain inconsistencies may be resolved (e.g., by tuning a historian, reducing and automating workload for system maintenance, etc.).

According to examples, the system and method disclosed herein may provide an expandable framework. In this regard, since an entire data supply chain may be scanned, the infrastructure related to the data supply chain may also be monitored, thus providing for the maintenance and security measures related to the data supply chain as well as the infrastructure related to the data supply chain.

According to examples, the system and method disclosed herein may provide various benefits for a process control domain such as ensuring of configuration quality, ensuring of data quality, security with respect to assets, asset management, alarm management with respect to assets, and application management.

The data reliability analysis system and the method for data reliability analysis disclosed herein provide a technical solution to technical problems related, for example, to data reliability determination. As disclosed herein, the system and method disclosed herein provide the technical solution of a configuration scanner that is executed by at least one hardware processor to scan a component of a data supply chain, and determine, based on the scan of the component of the data supply chain, configurations of the component of the data supply chain. A configuration analyzer that is executed by the at least one hardware processor may analyze the configurations of the component of the data supply chain, and detect, based on the analysis of the configurations of the component of the data supply chain, a change in at least one of the configurations of the component of the data supply chain. Further, the configuration analyzer may compare the change against a corresponding configuration rule to determine whether the change is a defect that affects consistency of data related to the component, and in response to a determination that the change is the defect that affects the consistency of the data related to the component, determine, based on the corresponding configuration rule, a solution related to the defect. A configuration modifier that is executed by the at least one hardware processor may modify, based on the solution related to the defect, a configuration of the configurations to correct the defect that affects the consistency of the data related to the component. The system and method disclosed herein may thus provide the technical solution of improved performance and reduced resource utilization with respect to components that generate, utilize, and/or manage data.

FIG. 1 illustrates an environment 100 including a data reliability analysis system 102 (e.g., system 102 as disclosed herein), according to an example of the present disclosure. Referring to FIG. 1, the environment 100 may include a data supply chain 104 including various components that may be used to ascertain data 106 (see FIG. 2). For example, the components of the data supply chain 104 may include PLC, DCS, OPS, Process Control Domain (PCD), historians, etc., as shown, other components such as sensors, sensor networks, control loops, routers, etc., and generally any type of data source.

The PCD may be described as an engineering discipline that pertains to architectures, mechanisms and algorithms for maintaining the output of a specific process within a desired range. For example, the temperature of a chemical reactor may be controlled to maintain a consistent product output. Process control may be used in industry and provide for mass production of consistent products from continuously operated processes such as oil refining, paper manufacturing, chemicals, power plants and many others. Process control may provide for automation, by which a small staff of operating personnel may operate a complex process from a central control room.

Figure 2:
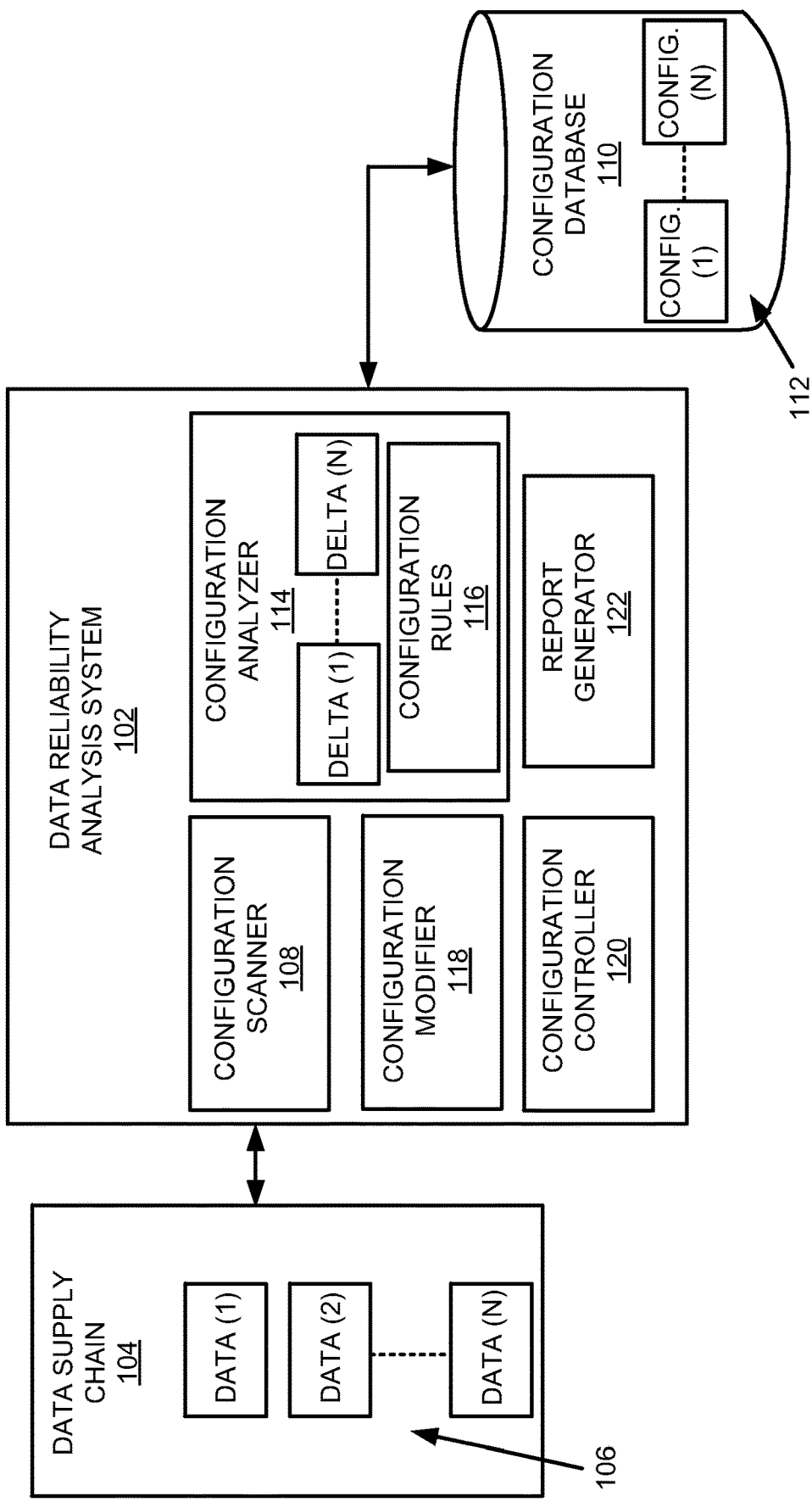
FIG. 2 illustrates an architectural diagram for the data reliability analysis system of FIG. 1, according to an example of the present disclosure.

Referring to FIGS. 1 and 2, the data supply chain 104 may be used by a configuration scanner 108 that is executed by at least one hardware processor (e.g., hardware processor 602 of FIG. 6) of the system 102 to generate a configuration database 110 that includes configurations 112 based on the data 106. The configurations 112 may be stored as configuration (1) to configuration (N) corresponding to data (1) to data (N) respectively for component (1) to component (N) (e.g., PLC, DCS, OPC, . . . , office historian, as illustrated in FIG. 1) of the data supply chain 104. The configuration scanner 108 may read (i.e., determine) configurations from the various different components of the data supply chain 104. According to examples, the configurations 112 may be determined from repeated scanning of the various different components of the data supply chain 104.

According to examples, the configuration scanner 108 may scan the configurations 112 of each component of the data supply chain 104, or selected components of the data supply chain 104. For the components that are subject to scanning, a first scan may be performed on a most recent backup from a process control system related to the particular component of the data supply chain 104. In this regard, scanning of a backup may eliminate any interference, for example, with respect to performance and/or content, of the scanned component, or on any related components of the data supply chain 104. The configuration scanner 108 may read all of the configuration data for the scanned component, and place the configuration data in the configuration database 110 as part of the configurations 112. According to examples, the configuration database 110 may be described as a standardized (i.e., vendor independent) and modeled (i.e., layered) database.

A configuration analyzer 114 that is executed by the at least one hardware processor may analyze the configurations 112 (i.e., analyze the backup files associated with the configurations 112) to identify versions of the configurations 112 (i.e., for each of the scanned components, associated backup file versions may be analyzed). For each of the scanned components (or selected ones of the scanned components), the configuration analyzer 114 may analyze the configurations 112 by comparing different versions (e.g., a current version to a selected previous version) of the configurations. The comparison may include determining whether Tags from a backup file have been deleted, altered, or created, for example, by analyzing attributes of the Tags. If a Tag has been altered (or also for Tag creation and deletion), the Tag may be analyzed against a configuration rule as disclosed herein to determine whether the alteration (and/or creation and/or deleted) is acceptable or is a defect. Based on the comparison, the configuration analyzer 114 may detect a change in the configuration of a scanned component of the data supply chain 104, and the change in the configuration may be subject to further analysis. A change may be described as an alteration of a Tag as described herein, or an alteration of an attribute of a Tag. The detected change (if any) for each component of the data supply chain 104 may be respectively denoted as delta (1) to delta (N) corresponding to the analysis of configuration (1) to configuration (N) corresponding to data (1) to data (N) respectively for component (1) to component (N) (e.g., PLC, DCS, OPC, . . . , office historian, as illustrated in FIG. 1) of the data supply chain 104.

The configuration analyzer 114 may also analyze the configurations 112 by comparing a current version of a backup file (or a particular selected version of a backup file) of the data supply chain 104 to a previous version of a backup file of the data supply chain 104. That is, the configuration analyzer 114 may compare a current version of a backup file for all of the configurations (1) to (N) against a previous version of a backup file for all of the configurations (1) to (N) (e.g., each configuration (1) to (N) for a current version may be compared to each configuration (1) to (N) for a previous version, where configuration (1) is compared to configurations (2) to (N), configuration (2) is compared to configurations (3) to (N), etc.). The configuration analyzer 114 may identify inconsistencies with respect to the comparison performed for the entire data supply chain 104. In this manner, the configuration analyzer 114 may detect a change in the configuration of the entire data supply chain 104, and the change in the configuration of the data supply chain 104 may be subject to further analysis. The detected change for the configuration of the entire data supply chain 104 may be denoted "delta (data supply chain)".

The configuration analyzer 114 may compare these changes (e.g., for the component of the data supply chain 104, and/or for data supply chain 104) pertaining to a subset (or all) of the configurations 112 against corresponding configuration rules 116. For example, the configuration rules 116 may pertain to the component of the data supply chain 104, and/or the entire data supply chain 104. The configuration rules 116 may be described as a rule or a set of rules where an attribute should be compliant. For example, a configuration rule may include a naming convention for Tag names. For example, a plant may include naming conventions for Tag names so that the Tags may be readily identified, and the Tag names are unique. Other examples of configuration rules may include the alarm level of a type of temperature sensor, where the alarm level may be set to 100° C., or the scan rate (i.e., sampling frequency) of a temperature sensor may be set to below one second, or a display accuracy for a value being set to two decimal places, etc.

The configuration rules 116 may include data stream type (Tag) specific rules (quality), vendor/system specific rules (optimization), customer specific rules (standardization), and management of change (security) rules.

The configuration analyzer 114 may mark (e.g., by flagging) any changes (and/or deviations) of the configurations with respect to the configuration rules 116 with respect to the components of the data supply chain 104, and/or the entire data supply chain 104 that are identified as a defect. As disclosed herein, a change may be described as an alteration of a Tag, or an alteration of an attribute of a Tag. A deviation may be described as a non-compliance of a change with a configuration rule.

According to examples, when a component of the data supply chain 104 is scanned for the first time, no previous backup exists. In this regard, the configuration analyzer 114 may mark all Tags for an initial check against the configuration rules 116. Thus for an initial check, based on the checking of all Tabs against the configuration rules 116, the configuration analyzer 114 may effectively provide insights into the operation of the component of the data supply chain 104 and/or the data supply chain 104.

With respect to the marked changes (and/or deviations) of the configurations with respect to the configuration rules 116 with respect to the components of the data supply chain 104, and/or the entire data supply chain 104, the configuration analyzer 114 may analyze all or selected ones of the other components of the data supply chain 104. In this manner, the configuration analyzer 114 may detect changes (and/or deviations) in the entire data supply chain 104 and/or between certain components of the data supply chain 104.

The configuration analyzer 114 may also contextualize the changes (and/or deviations) by performing analytics with respect to the configuration rules 116. For example, the configuration analyzer 114 may determine whether the changes (and/or deviations) are process based, represent security scan (Management of Change (MoC) compliance), Health, Safety, Security, and Environmental (HSSE), etc. MoC may be described as a procedure that defines and describes the process of changes in the PCD domain. A primary goal may include controlling of the changes to reduce risks. The MoC may describe was actions are done by what person in a specific time frame.

For each change (and/or deviation), the configuration analyzer 114 may operate in conjunction with a configuration modifier 118 that is executed by the at least one hardware processor to record a proposed solution based, for example, on the configuration rules 116 and/or previous similar changes (and/or deviations). For each solution, the configuration analyzer 114 may determine whether the solution should be automatically (e.g., without human intervention) addressed (e.g., by the configuration modifier 118) or manually addressed. If a solution should be manually addressed, the configuration analyzer 114 may begin a MoC workflow.

The configuration analyzer 114 may operate in conjunction with the configuration modifier 118 to store each combination and type of change (and/or deviation), and its solution, for subsequent use for detecting the same type of change (and/or deviation).

With respect to the configuration rules 116, each component of the data supply chain 104 and/or the data supply chain 104 may include different types and sets of configuration rules 116. Each set of the configuration rules 116 may include values, process information, and component information. With respect to values, a value may be an absolute, a limit, or boundaries for attribute compliance. For example, an alarm limit for boiling water should not be set at 200° C. Process information may refer to a physical parameter of the process that is described by an attribute. The attribute should be compliant with the nature of the process. This may be a value or a time range or an accuracy. For example, for boiling water the display accuracy should not be six decimal places, as this would provide no additional information. Asset information may refer to a physical parameter of an asset that is described by an attribute. The attribute should be compliant with the nature of that asset. This may be a value or a time range or an accuracy. For example, using a sensor for boiling water with a reaction speed of nine degrees in one minute, a scan rate should not be one hour. An inconsistency may occur when a Tag (same data stream) has one or more attributes that include different values in different systems (and thus, the attributes may be misconfigured).

The configuration modifier 118 may determine, based on the configuration rules 116, whether to send a trigger to a domain expert. Further, the configuration modifier 118 may determine, based on the configuration rules 116, whether to solve a particular issue associated with a component of the data supply chain 104.

The configuration modifier 118 may perform corrections with respect to any configuration change (and/or deviation) that is determined to be a defect based on the configuration rules 116. In this regard, the configuration modifier 118 may change a configuration file associated with a particular component of the data supply chain 104 that is determined to be a source of a defect. The change to the configuration file may be marked by the configuration modifier 118 so that further scans and analysis related to the particular configuration file may be determined as being allowed.

A configuration controller 120 that is executed by the at least one hardware processor may determine a scanning frequency of the data supply chain 104, based, for example, on the configuration rules 116. For example, a configuration rule may include a first scan rate for a given load on a component of the data supply chain 104, and a second scan rate for a different load (e.g., higher or lower load) on a component of the data supply chain 104. According to examples, the configuration controller 120 may generate visual indicators, such as heatmaps of the identified defects and/or changes. According to examples, the configuration controller 120 may control a component of the data supply chain 104, for example, by assisting with maintenance of the component.

A report generator 122 that is executed by the at least one hardware processor may generate a report on the trustworthiness of data. For example, the report generator 122 may provide an indication of a quality of the data. The report generator 122 may also provide various other indicators related to a configuration change. For example, the report generator 122 may indicate (e.g., via a visual display, a report, or otherwise), any change (and/or deviation) to a configuration of a component of the data supply chain 104 and/or the data supply chain 104 that is detected, and/or any change to a configuration of a component of the data supply chain 104 and/or the data supply chain 104 that is performed by the configuration modifier 118. In this regard, with respect to a change to a configuration of a component of the data supply chain 104 and/or the data supply chain 104 that is performed by the configuration modifier 118, the report generator 122 may mark such a change as being allowed.

The report generator 122 may manage and approve any proposed changes to a configuration of a component of the data supply chain 104 and/or the data supply chain 104 that is performed by the configuration modifier 118. In this regard, the report generator 122 may automatically (e.g., without human intervention) manage and approve proposed changes, and/or prompt a user of the system 102 for approval of proposed changes.

The report generator 122 may operate in conjunction with the configuration modifier 118 to manage and approve a particular workflow related to a component of the data supply chain 104 and/or the data supply chain 104, where such a workflow may alter the configuration and/or layout of a component of the data supply chain 104 and/or the data supply chain 104. In this regard, the report generator 122 may automatically (e.g., without human intervention) manage and approve a particular workflow, and/or prompt a user of the system 102 for approval of a particular workflow.

The report generator 122 may also analyze the quality of a Tag (e.g., by analyzing Tag attributes) to determine a quality value of real-time data that is being produced by the Tag at a specific time. In this regard, the quality value may be used as a trigger to determine whether to use or not to use the real-time data associated with the Tag. For example, if the quality related to a Tag is below a quality threshold, real-time data related to the Tag may not be used, and/or the report generator 122 may not use the real-time data related to the Tag on a KPI report.

The elements of the system 102 described herein may be machine readable instructions stored on a non-transitory computer readable medium. In addition, or alternatively, the elements of the system 102 may be hardware or a combination of machine readable instructions and hardware.

Figure 3:
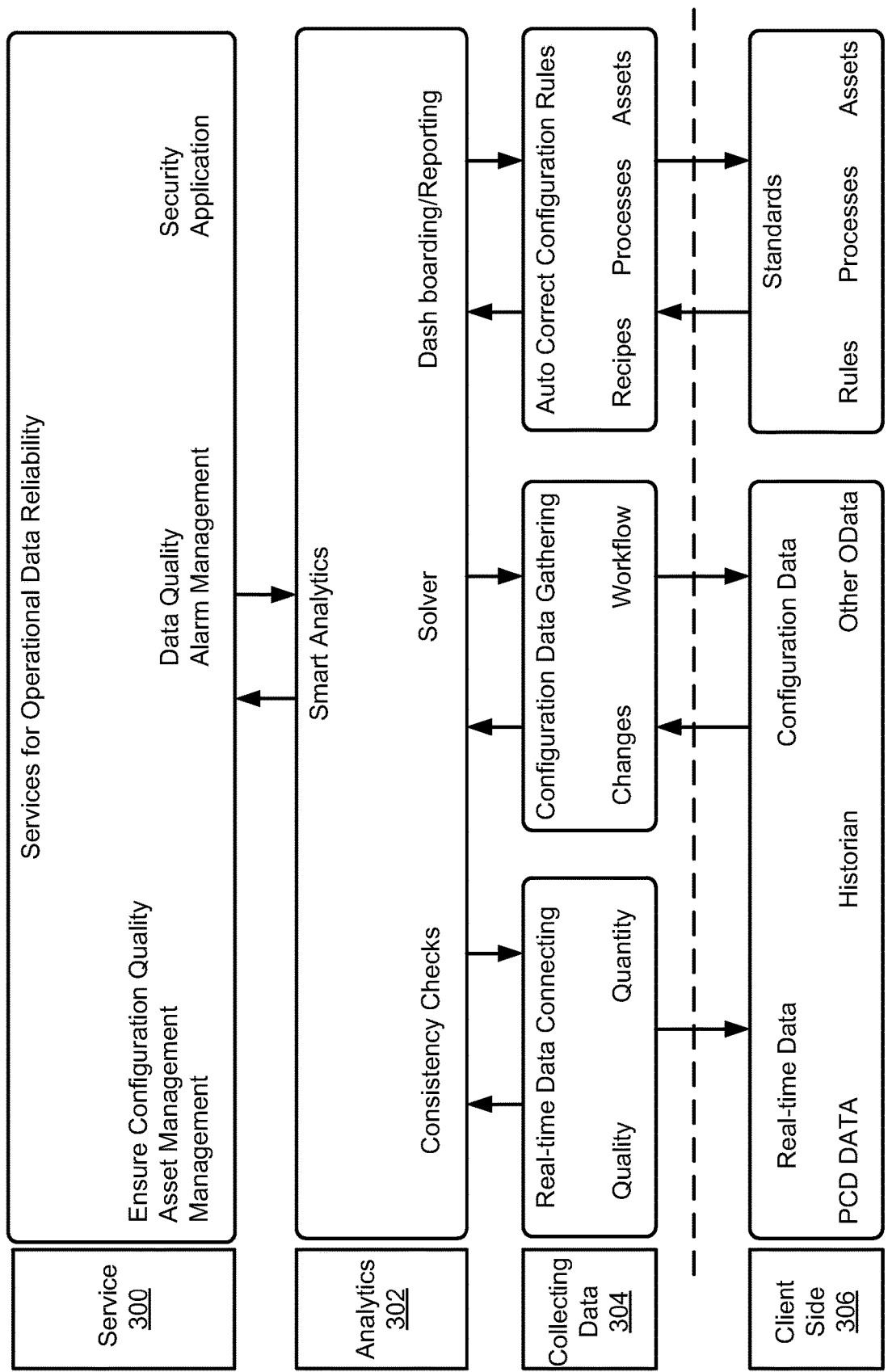
FIG. 3 illustrates an architectural diagram of an enterprise environment including the data reliability analysis system of FIG. 1, according to an example of the present disclosure.

FIG. 3 illustrates an architectural diagram of an enterprise environment including the system 102, according to an example of the present disclosure.

Referring to FIG. 3, the enterprise environment including the system 102 may include various layers, such as a service layer 300, an analytics layer 302, a data collection layer 304, and a client side layer 306.

With respect to the system 102, the service layer 300 may generally provide for the implementation of various benefits for a process control domain such as ensuring of configuration quality, ensuring of data quality, security with respect to assets, asset management, alarm management with respect to assets, and application management. Alarm management may be described as the application of human factors (or 'ergonomics') along with instrumentation engineering and systems to manage the design of an alarm system to increase its usability. Generally, a usability concern is that there are too many alarms annunciated in a plant system, commonly referred to as alarm flood (similar to an interrupt storm). However, there may also be other concerns with an alarm system such as poorly designed alarms (e.g., low quality configuration data), low quality of real time data, improperly set alarm points, ineffective annunciation, unclear alarm messages, etc.

With respect to the system 102, the analytics layer 302 may provide for implementation of the various elements of the system 102. For example, the analytics layer 302 may provide for implementation of the configuration scanner 108, the configuration analyzer 114, the configuration modifier 118, the configuration controller 120, and the report generator 122.

With respect to the system 102, the data collection layer 304 may provide for implementation of communication with respect to the elements of the system 102 and components of the client side layer 306, such as, the data supply chain 104, the configuration database 110, and the configuration rules 116.

Figure 4:
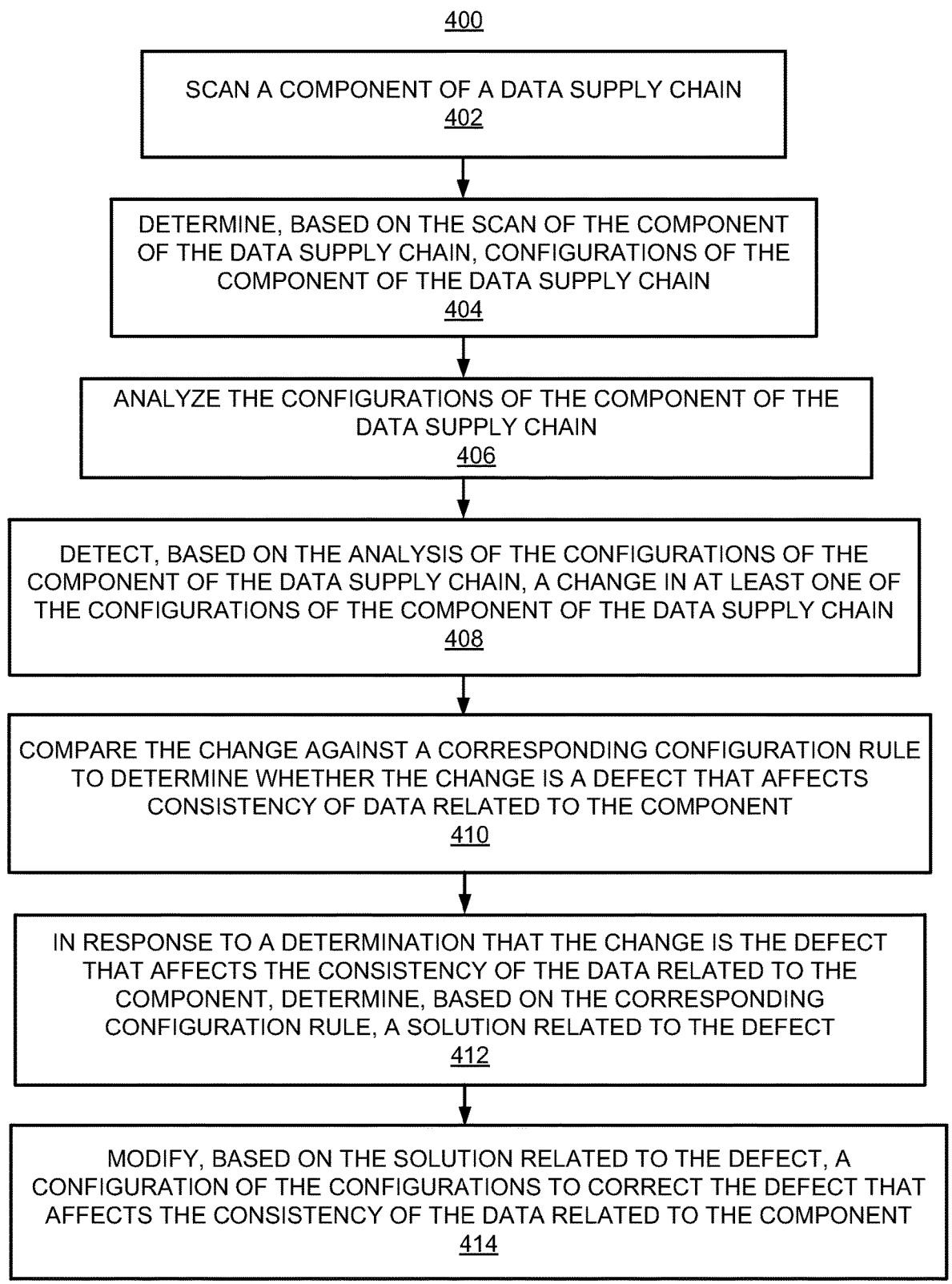
FIG. 4 illustrates a flow diagram of a method for data reliability analysis, according to an example of the present disclosure.

FIGS. 4 and 5 respectively illustrate flowcharts of methods 400 and 500 for data reliability analysis, according to examples. The methods 400 and 500 may be implemented on the system 102 described above with reference to FIGS. 1-3 by way of example and not limitation. The methods 400 and 500 may be practiced in other systems.

Referring to FIGS. 1-4, and particularly FIG. 4, at block 402, the method 400 may include scanning a component of a data supply chain 104.

At block 404, the method 400 may include determining, based on the scan of the component of the data supply chain 104, configurations 112 of the component of the data supply chain 104.

At block 406, the method 400 may include analyzing the configurations 112 of the component of the data supply chain 104.

At block 408, the method 400 may include detecting, based on the analysis of the configurations 112 of the component of the data supply chain 104, a change in at least one of the configurations 112 of the component of the data supply chain 104.

At block 410, the method 400 may include comparing the change against a corresponding configuration rule 116 to determine whether the change is a defect that affects consistency of data related to the component.

At block 412, in response to a determination that the change is the defect that affects the consistency of the data related to the component, the method 400 may include determining, based on the corresponding configuration rule 116, a solution related to the defect.

At block 414, the method 400 may include modifying, based on the solution related to the defect, a configuration of the configurations 112 to correct the defect that affects the consistency of the data related to the component.

According to examples, the method 400 may include scanning components including the component of the data supply chain 104, and determining, based on the scan of the components of the data supply chain 104, configurations 112 of the components of the data supply chain 104. Further, the method 400 may include analyzing the configurations 112 of the components of the data supply chain 104, detecting, based on the analysis of the configurations 112 of the components of the data supply chain 104, a change in at least one of the configurations 112 of the components of the data supply chain 104 and a change in a configuration of the data supply chain 104, and comparing the change in the configuration of the data supply chain 104 against another corresponding configuration rule 116 to determine whether the change in the configuration of the data supply chain 104 is another defect that affects consistency of further data related to the data supply chain 104.

According to examples, in response to a determination that the change is the another defect that affects the consistency of the further data related to the data supply chain 104, the method 400 may include determining, based on the another corresponding configuration rule 116, a further solution related to the another defect that affects the consistency of the further data related to the data supply chain 104. Further, the method 400 may include modifying, based on the further solution related to the another defect that affects the consistency of the further data related to the data supply chain 104, the configuration of the data supply chain 104 to correct the another defect that affects the consistency of the further data related to the data supply chain 104.

According to examples, the method 400 may include determining, based on the scan of the component of the data supply chain 104, configurations 112 of the component of the data supply chain 104 by determining, based on the scan of the component of the data supply chain 104, backup files of the component of the data supply chain 104.

According to examples, the method 400 may include identifying, based on the scan of the component of the data supply chain 104, versions of the backup files of the component of the data supply chain 104, analyzing different versions of the backup files of the component of the data supply chain 104 by comparing the different versions of the backup files of the component of the data supply chain 104, detecting, based on the analysis of the different versions of the backup files of the component of the data supply chain 104, the change in at least one of the versions of the backup files of the component of the data supply chain 104, and comparing the change against the corresponding configuration rule 116 to determine whether the change is the defect that affects the consistency of the data related to the component.

According to examples, the method 400 may include determining, based on the scan of the components of the data supply chain 104, configurations 112 of the components of the data supply chain 104 by determining, based on the scan of the components of the data supply chain 104, backup files of the components of the data supply chain 104.

According to examples, the method 400 may include identifying, based on the scan of the components of the data supply chain 104, versions of the backup files of the components of the data supply chain 104, analyzing different versions of the backup files of the components of the data supply chain 104 by comparing the different versions of the backup files of the components of the data supply chain 104 with respect to each associated component and each other component of the data supply chain 104, detecting, based on the analysis of the different versions of the backup files of the components of the data supply chain 104, the change in at least one of the versions of the backup files of the components of the data supply chain 104 and a change in a backup file of the data supply chain 104, and comparing the change in the backup file of the data supply chain 104 against another corresponding configuration rule 116 to determine whether the change in the backup file of the data supply chain 104 is another defect that affects consistency of further data related to the data supply chain 104.

According to examples, for the method 400, the configuration rule 116 may be related to the consistency of at least one of the component and the data supply chain 104.

According to examples, the method 400 may include determining whether the change is a process based change related to a process associated with the component, a security based change related to security of the component, and/or a component based change related to hardware or code related to the component.

According to examples, the method 400 may include recording the modification to the configuration of the configurations 112 to correct the defect that affects the consistency of the data related to the component, and bypassing analysis related to the modification for future analysis of the configurations 112 of the component of the data supply chain 104.

According to examples, the method 400 may include determining a scanning frequency of the component of the data supply chain 104 based on the corresponding configuration rule 116.

According to examples, the method 400 may include determining a scanning frequency of the component of the data supply chain 104 based on a computational load associated with the component of the data supply chain 104.

According to examples, the method 400 may include generating a report related to the change in the at least one of the configurations 112 of the component of the data supply chain 104, the solution related to the defect, and/or the modification, based on the solution related to the defect, of the configuration of the configurations 112 to correct the defect that affects the consistency of the data related to the component.

According to examples, the method 400 may include determining a workflow order of components of the data supply chain 104 to modify the configuration of the component of the data supply chain 104 to correct the defect that affects the consistency of the data related to the component.

According to examples, the method 400 may include generating a report related to the workflow order of the components of the data supply chain 104 to modify the configuration of the component of the data supply chain 104 to correct the defect that affects the consistency of the data related to the component.

Referring to FIGS. 1-3, and 5, and particularly FIG. 5, at block 502, the method 500 may include scanning components of a data supply chain 104.

At block 504, the method 500 may include determining, based on the scan of the components of the data supply chain 104, configurations 112 of the components of the data supply chain 104.

At block 506, the method 500 may include analyzing the configurations 112 of the components of the data supply chain 104.

At block 508, the method 500 may include detecting, based on the analysis of the configurations 112 of the components of the data supply chain 104, a change in at least one of the configurations 112 of the components of the data supply chain 104 and a change in a configuration of the data supply chain 104.

At block 510, the method 500 may include comparing the change in the configuration of the data supply chain 104 against a corresponding configuration rule 116 to determine whether the change in the configuration of the data supply chain 104 is a defect that affects consistency of data related to the data supply chain 104.

At block 512, in response to a determination that the change is the defect that affects the consistency of the data related to the data supply chain 104, the method 500 may include determining, based on the corresponding configuration rule 116, a solution related to the defect that affects the consistency of the data related to the data supply chain 104.

At block 514, the method 500 may include modifying, based on the solution related to the defect that affects the consistency of the data related to the data supply chain 104, the configuration of the data supply chain 104 to correct the defect that affects the consistency of the data related to the data supply chain 104.

According to examples, the method 500 may include determining, based on the scan of the components of the data supply chain 104, configurations 112 of the components of the data supply chain 104 by determining, based on the scan of the components of the data supply chain 104, backup files of the components of the data supply chain 104.

According to examples, the method 500 may include identifying, based on the scan of the components of the data supply chain 104, versions of the backup files of the components of the data supply chain 104, analyzing different versions of the backup files of the components of the data supply chain 104 by comparing the different versions of the backup files of the components of the data supply chain 104 with respect to each associated component and each other component of the data supply chain 104, detecting, based on the analysis of the different versions of the backup files of the components of the data supply chain 104, the change in at least one of the versions of the backup files of the components of the data supply chain 104 and a change in a backup file of the data supply chain 104, and comparing the change in the backup file of the data supply chain 104 against another corresponding configuration rule 116 to determine whether the change in the backup file of the data supply chain 104 is another defect that affects consistency of further data related to the data supply chain 104.

According to examples, a method for data reliability analysis may include determining a scanning frequency of a component of a data supply chain 104 based on a corresponding configuration rule 116 related to the component of the data supply chain 104, and scanning, based on the scanning frequency, the component of the data supply chain 104. The method for data reliability analysis may further include determining, based on the scan of the component of the data supply chain 104, configurations 112 of the component of the data supply chain 104, analyzing the configurations 112 of the component of the data supply chain 104, and detecting, based on the analysis of the configurations 112 of the component of the data supply chain 104, a change in at least one of the configurations 112 of the component of the data supply chain 104. The method for data reliability analysis may further include comparing the change against the corresponding configuration rule 116 to determine whether the change is a defect that affects consistency of data related to the component, in response to a determination that the change is the defect that affects the consistency of the data related to the component, determining, based on the corresponding configuration rule 116, a solution related to the defect, and modifying, based on the solution related to the defect, a configuration of the configurations 112 to correct the defect that affects the consistency of the data related to the component. The method for data reliability analysis may further include determining a workflow order of components of the data supply chain 104 to modify the configuration of the component of the data supply chain 104 to correct the defect that affects the consistency of the data related to the component.

Figure 6:
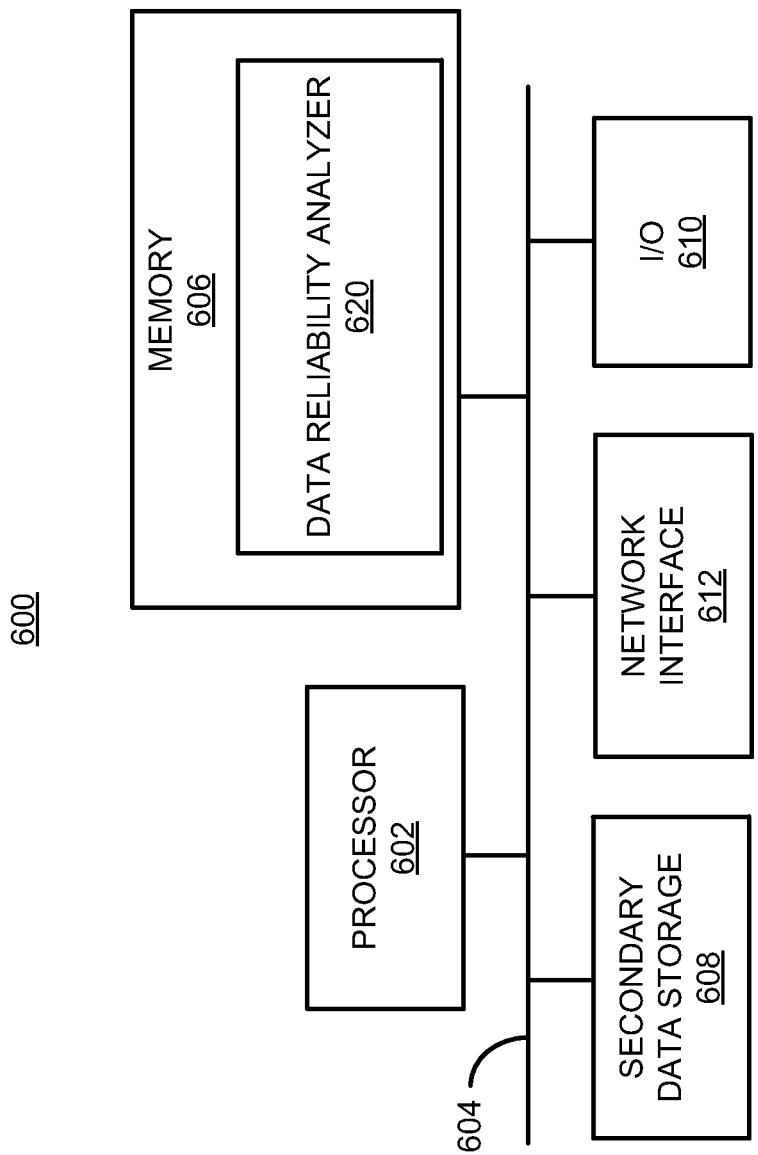
FIG. 6 illustrates a computer system, according to an example of the present disclosure.

FIG. 6 shows a computer system 600 that may be used with the examples described herein. The computer system may represent a generic platform that includes components that may be in a server or another computer system. The computer system 600 may be used as a platform for the system 102. The computer system 600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 may include a processor 602 that may implement or execute machine readable instructions performing some or all of the methods, functions and other processes described herein. Commands and data from the processor 602 may be communicated over a communication bus 604. The computer system may also include a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include a data reliability analyzer 620 including machine readable instructions residing in the memory 606 during runtime and executed by the processor 602. The data reliability analyzer 620 may include the elements of the system 102 shown in FIGS. 1 and 2.

The computer system 600 may include an I/O device 610, such as a keyboard, a mouse, a display, etc. The computer system may include a network interface 612 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A data reliability analysis system comprising:
  a configuration scanner, executed by at least one hardware processor, to
  determine a scanning frequency of a component of a data supply chain,
  scan, based on the determined scanning frequency, the component of the data supply chain, and
  determine, based on the scan of the component of the data supply chain, configurations of the component of the data supply chain;
  a configuration analyzer, executed by the at least one hardware processor, to analyze the configurations of the component of the data supply chain, detect, based on the analysis of the configurations of the component of the data supply chain, a change in at least one of the configurations of the component of the data supply chain,
  compare the change against a corresponding configuration rule pertaining to the component of the data supply chain, the configuration rule being a rule where an attribute that describes how a data stream originating from an input signal will be handled in a particular system should be compliant to determine whether the change is at least one defect that affects consistency of data related to the component, wherein an inconsistency occurs when a tag or the data stream has one or more attributes that include different values in different systems and a defect is a non-compliance of the change with the configuration rule, and
  in response to a determination that the change is the at least one defect that affects the consistency of the data related to the component, determine, based on the corresponding configuration rule, a solution related to the at least one defect; and
  a configuration modifier, executed by the at least one hardware processor, to
  modify, based on the solution related to the at least one defect, a configuration of the configurations to correct the at least one defect that affects the consistency of the data related to the component, wherein the at least one defect includes a plurality of defects,
  determine whether a total number of the defects is greater than a specified threshold, and
  based on a determination that the total number of the defects is greater than the specified threshold, increase the determined scanning frequency,
  wherein the configuration analyzer is further to record the modification to the configuration of the configurations to correct the at least one defect that affects the consistency of the data related to the component, and bypass analysis related to the modification for future analysis of the configurations of the component of the data supply chain.

2. The data reliability analysis system according to claim 1, where the configuration scanner is further to scan components including the component of the data supply chain, and determine, based on the scan of the components of the data supply chain, configurations of the components of the data supply chain, and the configuration analyzer is further to analyze the configurations of the components of the data supply chain, detect, based on the analysis of the configurations of the components of the data supply chain, a change in at least one of the configurations of the components of the data supply chain and a change in a configuration of the data supply chain, and compare the change in the configuration of the data supply chain against another corresponding configuration rule to determine whether the change in the configuration of the data supply chain is another defect that affects consistency of further data related to the data supply chain.

3. The data reliability analysis system according to claim 2, where the configuration analyzer is further to in response to a determination that the change is the another defect that affects the consistency of the further data related to the data supply chain, determine, based on the another corresponding configuration rule, a further solution related to the another defect that affects the consistency of the further data related to the data supply chain, and the configuration modifier is further to modify, based on the further solution related to the another defect that affects the consistency of the further data related to the data supply chain, the configuration of the data supply chain to correct the another defect that affects the consistency of the further data related to the data supply chain.

4. The data reliability analysis system according to claim 1, where the configuration scanner is to determine, based on the scan of the component of the data supply chain, configurations of the component of the data supply chain by determining, based on the scan of the component of the data supply chain, backup files of the component of the data supply chain.

5. The data reliability analysis system according to claim 4, where the configuration scanner is further to identify, based on the scan of the component of the data supply chain, versions of the backup files of the component of the data supply chain, and the configuration analyzer is further to analyze different versions of the backup files of the component of the data supply chain by comparing the different versions of the backup files of the component of the data supply chain, detect, based on the analysis of the different versions of the backup files of the component of the data supply chain, the change in at least one of the versions of the backup files of the component of the data supply chain, and compare the change against the corresponding configuration rule to determine whether the change is the at least one defect that affects the consistency of the data related to the component.

6. The data reliability analysis system according to claim 2, where the configuration scanner is to determine, based on the scan of the components of the data supply chain, configurations of the components of the data supply chain by determining, based on the scan of the components of the data supply chain, backup files of the components of the data supply chain.

7. The data reliability analysis system according to claim 6, where the configuration scanner is further to identify, based on the scan of the components of the data supply chain, versions of the backup files of the components of the data supply chain, and the configuration analyzer is further to analyze different versions of the backup files of the components of the data supply chain by comparing the different versions of the backup files of the components of the data supply chain with respect to each associated component and each other component of the data supply chain, detect, based on the analysis of the different versions of the backup files of the components of the data supply chain, the change in at least one of the versions of the backup files of the components of the data supply chain and a change in a backup file of the data supply chain, and compare the change in the backup file of the data supply chain against another corresponding configuration rule to determine whether the change in the backup file of the data supply chain is another defect that affects consistency of further data related to the data supply chain.

8. The data reliability analysis system according to claim 1, where the configuration analyzer is further to determine whether the change is a security based change related to security of the component.

9. The data reliability analysis system according to claim 1, further comprising:

a configuration controller, executed by the at least one hardware processor, to determine a scanning frequency of the component of the data supply chain based on the corresponding configuration rule.

10. The data reliability analysis system according to claim 1, further comprising:

a configuration controller, executed by the at least one hardware processor, to determine a scanning frequency of the component of the data supply chain based on a computational load associated with the component of the data supply chain.

11. The data reliability analysis system according to claim 1, further comprising:

a report generator, executed by the at least one hardware processor, to generate a report related to at least one of the change in the at least one of the configurations of the component of the data supply chain, the solution related to the at least one defect, or the modification, based on the solution related to the at least one defect, of the configuration of the configurations to correct the at least one defect that affects the consistency of the data related to the component.

12. The data reliability analysis system according to claim 1, where the configuration modifier is further to
determine a workflow order of components of the data supply chain to modify the configuration of the component of the data supply chain to correct the at least one defect that affects the consistency of the data related to the component.

13. The data reliability analysis system according to claim 1, where the configuration rule is related to a display accuracy of the component of the data supply change.

14. The data reliability analysis system according to claim 1, where the configuration rule is related to an alert level related to operation of the component of the data supply change.

15. The data reliability analysis system according to claim 1, where the configuration analyzer is to analyze the configurations of the component of the data supply chain by
comparing a current version of a configuration to a selected previous version of the configurations to determine whether a tag from a backup file has been deleted, altered, or created.

16. The data reliability analysis system according to claim 15, where, in response to a determination that the tag from a backup file has been deleted, altered, or created, the configuration analyzer is to
analyze the tag relative to the corresponding configuration rule to determine whether the deletion, alteration, or creation is the at least one defect that affects the consistency of data related to the component.

17. A method for data reliability analysis, the method comprising:
determining, by a hardware processor, a scanning frequency of components of a data supply chain;
scanning, based on the determined scanning frequency, the components of the data supply chain;
determining, based on the scan of the components of the data supply chain, configurations of the components of the data supply chain;
analyzing the configurations of the components of the data supply chain;
detecting, based on the analysis of the configurations of the components of the data supply chain, a change in at least one of the configurations of the components of the data supply chain and a change in a configuration of the data supply chain;
comparing the change in the configuration of the data supply chain against a corresponding configuration rule pertaining to the components of the data supply chain, the configuration rule being a rule where an attribute that describes how a data stream originating from an input signal will be handled in a particular system should be compliant, to determine whether the change in the configuration of the data supply chain is at least one defect that affects consistency of data related to the data supply chain, wherein an inconsistency occurs when a tag or the data stream has one or more attributes that include different values in different systems and a defect is a non-compliance of the change with the configuration rule;
in response to a determination that the change is the at least one defect that affects the consistency of the data related to the data supply chain, determining, based on the corresponding configuration rule, a solution related to the at least one defect that affects the consistency of the data related to the data supply chain;

modifying, based on the solution related to the at least one defect that affects the consistency of the data related to the data supply chain, the configuration of the data supply chain to correct the at least one defect that affects the consistency of the data related to the data supply chain, wherein the at least one defect includes a plurality of defects;
determining whether a total number of the defects is greater than a specified threshold,
based on a determination that the total number of the defects is greater than the specified threshold, increasing the determined scanning frequency;
recording the modification to the configuration to correct the at least one defect that affects the consistency of the data related to the data supply chain; and
bypassing analysis related to the modification for future analysis of the configurations of the component of the data supply chain.

18. The method for data reliability analysis according to claim 17, where determining, based on the scan of the components of the data supply chain, configurations of the components of the data supply chain further comprises determining, based on the scan of the components of the data supply chain, backup files of the components of the data supply chain, further comprising:
identifying, based on the scan of the components of the data supply chain, versions of the backup files of the components of the data supply chain;
analyzing different versions of the backup files of the components of the data supply chain by comparing the different versions of the backup files of the components of the data supply chain with respect to each associated component and each other component of the data supply chain;
detecting, based on the analysis of the different versions of the backup files of the components of the data supply chain, the change in at least one of the versions of the backup files of the components of the data supply chain and a change in a backup file of the data supply chain; and
comparing the change in the backup file of the data supply chain against another corresponding configuration rule to determine whether the change in the backup file of the data supply chain is another defect that affects consistency of further data related to the data supply chain.

19. A non-transitory computer readable medium having stored thereon machine readable instructions for data reliability analysis, the machine readable instructions when executed cause a computer system to:
determine a scanning frequency of a component of a data supply chain based on a corresponding configuration rule related to the component of the data supply chain;
scan, based on the scanning frequency, the component of the data supply chain;
determine, based on the scan of the component of the data supply chain, configurations of the component of the data supply chain;
analyze the configurations of the component of the data supply chain;
detect, based on the analysis of the configurations of the component of the data supply chain, a change in at least one of the configurations of the component of the data supply chain;
compare the change against the corresponding configuration rule pertaining to the component of the data supply chain, the configuration rule being a rule where an attribute that describes how a data stream originating from an input signal will be handled in a particular system should be compliant to determine whether the change is at least one defect that affects consistency of data related to the component, wherein an inconsistency occurs when a tag or the data stream has one or more attributes that include different values in different systems and a defect is a non-compliance of the change with the configuration rule;

in response to a determination that the change is the at least one defect of a total number of defects that affects the consistency of the data related to the component, determine, based on the corresponding configuration rule, a solution related to the at least one defect of the total number of defects;

modify, based on the solution related to the at least one defect, a configuration of the configurations to correct the at least one defect that affects the consistency of the data related to the component;

record the modification to the configuration to correct the at least one defect that affects the consistency of the data related to the component; and bypass analysis related to the modification for future analysis of the configurations of the component of the data supply chain.

* * * * *